(12) United States Patent
Hollars

(10) Patent No.: US 7,334,598 B1
(45) Date of Patent: Feb. 26, 2008

(54) PRESSURE REGULATOR ADAPTABLE TO COMPRESSED GAS CARTRIDGE

(76) Inventor: Anthony Scott Hollars, 2700 E. Bilby Rd., Tucson, AZ (US) 85706

(*) Notice: Subject to any disclaimer, the term of this patent is extended or adjusted under 35 U.S.C. 154(b) by 173 days.

(21) Appl. No.: 11/150,687

(22) Filed: Jun. 9, 2005

Related U.S. Application Data (60) Provisional application No. 60/579,763, filed on Jun. 16, 2004.

(51) Int. Cl.
*G05D 16/10* (2006.01)

(52) U.S. Cl. .............................. 137/116.3; 137/505.25; 137/505.41; 137/505.42; 251/332

(58) Field of Classification Search ............. 137/116.3, 137/116.5, 505.25, 505.28, 505.41, 505.42; 251/332
See application file for complete search history.

(56) References Cited

U.S. PATENT DOCUMENTS

| | | | | |
|---|---|---|---|---|
| 1,003,916 | A * | 9/1911 | Koenig ................ | 137/505.42 |
| 2,930,578 | A * | 3/1960 | Piros ..................... | 251/332 |
| 3,197,144 | A * | 7/1965 | Kochner ............... | 137/505.25 |
| 4,370,997 | A * | 2/1983 | Braithwaite et al. .... | 137/116.3 |
| 4,445,532 | A * | 5/1984 | Mitchell ............... | 137/495 |
| 4,694,850 | A * | 9/1987 | Fumino ................ | 137/318 |
| 4,880,034 | A * | 11/1989 | Takahashi ............. | 137/505.25 |
| 5,628,350 | A | 5/1997 | Gibb | |
| 6,363,964 | B1 * | 4/2002 | Carroll ................ | 137/505.41 |
| 6,581,628 | B2 * | 6/2003 | Smith ................... | 137/454.2 |
| 6,843,388 | B1 | 1/2005 | Hollars | |
| 2004/0217198 | A1 | 11/2004 | Lloyd | |

OTHER PUBLICATIONS

Pending U.S. Appl. No. 10/199,286, Anthony S. Hollars.

* cited by examiner

*Primary Examiner*—Stephen M. Hepperle
(74) *Attorney, Agent, or Firm*—Chandler & Udall, LLP; Dale F. Regelman

(57) ABSTRACT

This pressure regulator is specifically designed to operate with a portable compressed gas cartridge thus reducing the high vapor pressure found in compressed gas cartridges down to a substantially consistent outlet pressure. Due to the nature of the crowded regulator art, the soon to be embodied pressure regulator has been specifically embodied for use in the portable compressed gas cartridge harnessing art and this specific use is carried into the claims. Exemplified in the pressure regulator embodiments is a reduced amount of components over existing designs. Additionally, safety and reliability features have been integrated into the design and will shortly be taught in the following paragraphs. A burp-off feature in all embodiments will be exemplified that vents back-pressure spikes as well as a method of adjusting the burp-off back-pressure spikes independent of regulated pressure in some embodiments.

6 Claims, 6 Drawing Sheets

PRESSURE REGULATOR ADAPTABLE TO COMPRESSED GAS CARTRIDGE

CROSS REFERENCE TO RELATED APPLICATIONS

Provisional patent application No. 60/579,763 filed Jun. 16, 2004.

FEDERALLY SPONSORED RESEARCH

Not applicable.

REFERENCE TO A MICROFICHE APPENDIX

Not applicable.

FIELD OF THE INVENTION

This invention relates to a piston-type fluid pressure regulator featuring a novel fluid inlet valve, capable of regulating inlet pressures ranging from low to high. More particularly, the present invention is capable of regulating portable, compressed gas cartridges at high pressure down to a workable, substantially constant outlet pressure. Fewer components over the prior-art are one design emphasis thus making a simplistic and reliable regulator that is both easy and relatively inexpensive to manufacture.

BACKGROUND OF THE INVENTION

Pressure regulators have existed for many years and the field is crowded with different designs. Yet, innovative features are still being introduced into pressure regulators such as safety features, compatibility with different fluids, construction materials and others.

Two major species of mechanical fluid pressure regulators are common: piston-type and diaphragm-type. In general, however, these have not proven entirely satisfactory in practice.

A piston-type regulator uses a spring-biased piston in a bore to regulate output pressure with the piston always trying to reside in equilibrium. When not in equilibrium, the piston moves up or down in the bore thus opening or shutting an intake valve from a high-pressure source. One side of the piston is biased by a spring force and the other side of the piston is biased by pressurized gas.

A diaphragm-type regulator works in a very similar way. Rather than moving a piston in a bore, a diaphragm acts as a flexure, biased on one side typically by a spring. The other side of the diaphragm contains the regulated pressure. When the biasing forces on each side are not in equilibrium, the diaphragm flexes thus opening or closing an inlet valve from the high-pressure source.

Regulators that are designed to handle high source pressures, whether they be of the piston-type or diaphragm-type typically use a hard valve and seat as the major components of the inlet valve assembly. The design of a hard valve and seat works well until the smallest bit of contamination, corrosion, or surface imperfection or seal 'set' is introduced into the valve assembly. The result is a faulty regulator that will not predictably produce a substantially constant outlet pressure.

Likewise, a piston-type or diaphragm-type regulator designed to regulate lower source pressures typically uses a soft elastomeric seal in the valve assembly to hold back the source pressure. This art is less prone to failure due to contamination, corrosion, or surface imperfections compared to the hard valve and seat because the elastomeric seal conforms to minor valve imperfections. Unfortunately, an elastomeric seal is not capable of retaining high source pressures because the high pressures may cause permanent deformation and/or swelling. In addition, explosive decompression results when the high-pressure source is suddenly removed from an elastomeric seal sometimes causing a permanently defective seal.

U.S. Pat. No. 6,843,388, titled *Compressed Gas Cartridge Dispensing System Allowing Interchangeable Use Of Different Capacity Compressed Gas Cartridges And Novel Storage Feature*, filed Jul. 22, 2002 by Hollars (same inventor) extensively elaborates on methods of harnessing threaded and non-threaded compressed gas cartridges. The same referenced application also discusses many of the available capacities and dimensions of compressed gas cartridges commonly available.

The most similar prior-art pressure regulation device located in a prior-art search that even remotely resembles the present invention utilizes an equal or greater number of components. U.S. Pat. No. 5,628,350 by Gibb titled Inflating device that comprises, at minimum, thirteen components to achieve similar results. Yet, Gibb's patent offers no pressure relief features that prevent the regulated fluid pressure from becoming excessive as will be elaborated in the following embodiments.

SUMMARY OF THE INVENTION

This pressure regulator is specifically designed to operate with a portable compressed gas cartridge thus reducing the high vapor pressure found in compressed gas cartridges down to a substantially consistent outlet pressure. Due to the nature of the crowded regulator art, the soon to be embodied pressure regulator has been specifically embodied for use in the portable compressed gas cartridge harnessing art and this specific use is carried into the claims. Exemplified in the pressure regulator embodiments is a reduced amount of components over existing designs. Additionally, safety and reliability features have been integrated into the design and will shortly be taught in the following paragraphs. A burp-off feature in all embodiments will be exemplified that vents back-pressure spikes as well as a method of adjusting the burp-off back-pressure spikes independent of regulated pressure in some embodiments.

The present invention has solved the problems cited above. Broadly, this is a regulator design comprising rather typical regulator architecture but with a unique hybrid valve design that has the advantages of both hard seat and soft elastomeric seal. This valve is designed to be sealed by an elastomeric seal while being supported on a rigid seat.

The benefits in this design allow source pressures to be rather low or extremely high. Typically, the flow-obstructing component of this assembly is a rigid ball or substantially circular disk. The rigid seat allows only the obstructing component of the valve to compress the elastomeric seal a pre-determined amount. Any additional forces on the valve obstructing part, such as from a high source pressure, transfer to the rigid valve seat, thus not further compressing the elastomeric seal and damaging it.

This hybrid valve assembly allows increased versatility over previous designs and has proven to work well in a pressure regulator. One major benefit is that the source pressure can start out high such as occurs when harnessing a compressed gas cartridge, or when a harnessed compressed gas cartridge is subjected to heat where only the traditional hard valve and seat design would reliably retain such source pressures. At a later time, such as when some of the fluid in a compressed gas cartridge has been consumed, the source pressure is lower. A traditional elastomeric sealed inlet valve would appropriately retain the lower pressure but would not have worked when the source pressure was higher. Therefore, a need exists for a valve that can handle extremely high inlet pressures and reliably work as the inlet pressure considerably decreases. In practice, this scenario is typical when harnessing a compressed gas cartridge and desiring a substantially constant outlet pressure regardless of cartridge (source) pressure.

Additionally, because the rigid valve seat is supporting the flow-obstructing component of the valve, the elastomeric seal is prevented from taking a compression-set and works well as valve assembly temperature varies. This is also resistant to contamination or corrosion allowing long-term reliable containment of high or low pressures providing advantages of both valve prior-art designs without the disadvantages of either.

The main regulator body is preferably molded from a fiber-reinforced plastic therefore features can easily be reproduced on each unit once the initial molds are built.

A safety feature that particularly is preferred is negative vents that allow fluid to escape the regulator should the pressure contained by the piston and biased by the regulator main spring become excessive. It is an object of the invention to provide adequate system adjustability so that the regulator can burp off excessive back-pressure.

This regulator is intended to be manufactured from as few components as possible.

The regulator is intended to be manufactured utilizing as many parts as possible out of a plastic material.

The intention of this design is simplicity through fewer parts with perhaps lower manufacturing cost than any existing regulator available today. Additionally, high reliability should be realized from the repeatability standpoint of plastic molded parts. Once the design is proven, each duplicate part should be substantially equal.

BRIEF DESCRIPTION OF THE DRAWINGS

The figures are exemplary of different embodiments of the present invention. Each illustration conveys the invention and is not to be considered as limiting, rather, exemplary to the scope and spirit of the present invention. Like components in the figures share identical numbering.

DETAILED DESCRIPTION

Figure 1:
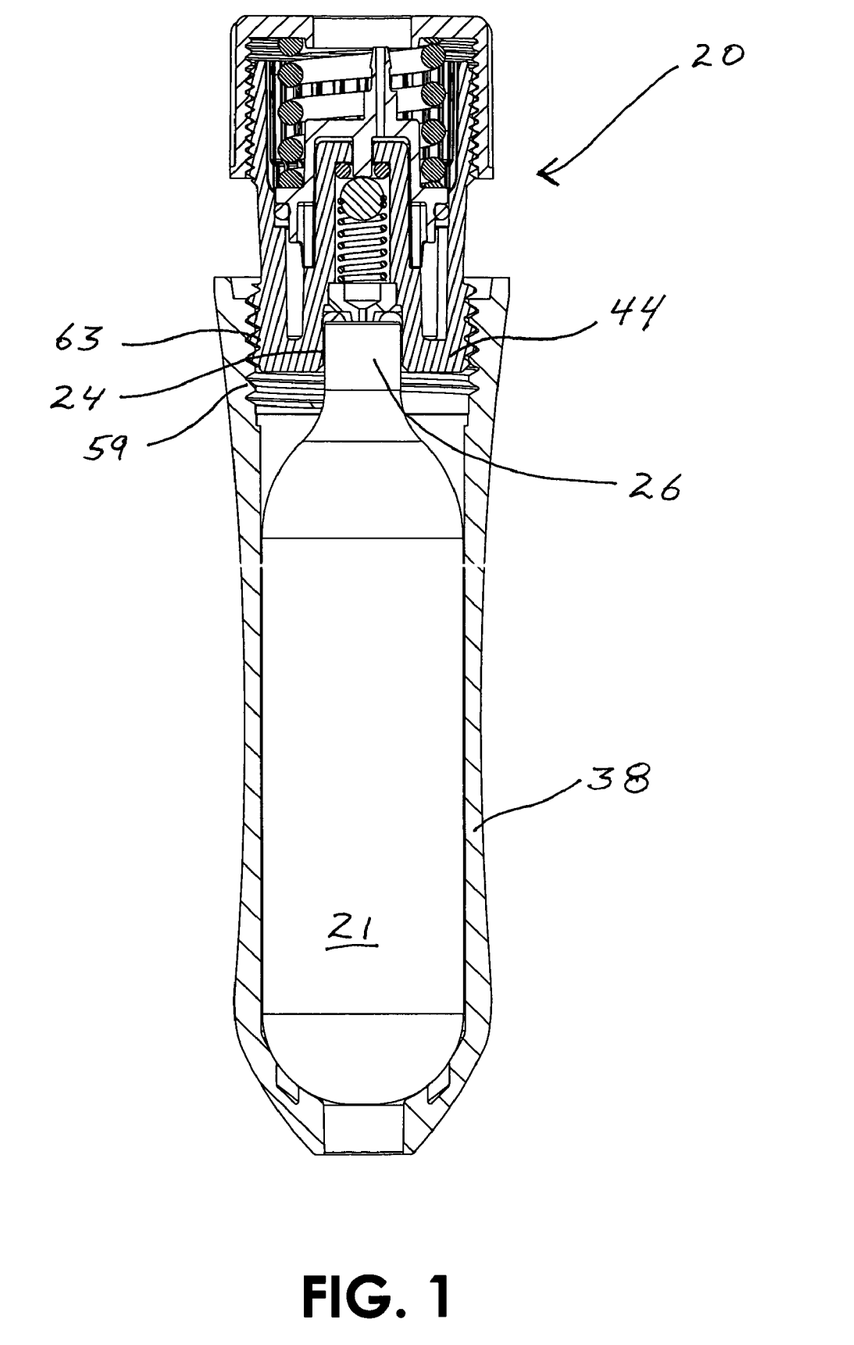
FIG. 1 illustrates a partial cross-sectional view of an exemplary piston-type pressure regulator of the present invention comprising a compressed gas cartridge and cartridge-retaining cup threadably attached, in accordance with an embodiment of the present invention.

FIG. 1 illustrates an exemplary embodiment of a pressure regulator 20 of the present invention. Although the present invention is primarily intended to be used with a pressurized cartridge 21 consisting essentially of $CO_2$ gas, other pressurized gases or fluids may be harnessed out of compressed gas cartridges such as nitrogen or oxygen. Pressure regulator 20 generally includes a cartridge-retaining container 38 and a regulator body 44. Cartridge-retaining container 38 and regulator body 44 are preferably molded from a glass-filled nylon or similar material. A female thread 59 on cartridge-retaining container mates with a male thread 63 that is integrally formed as a feature on regulator body 44. Naturally, other materials exhibiting the afore-mentioned characteristics are equally suitable. Compressed gas cartridge 21 comprises a neck 26 that fits into a non-threaded lance housing 24 that is an integral feature of pressure regulator 20.

Figure 2:
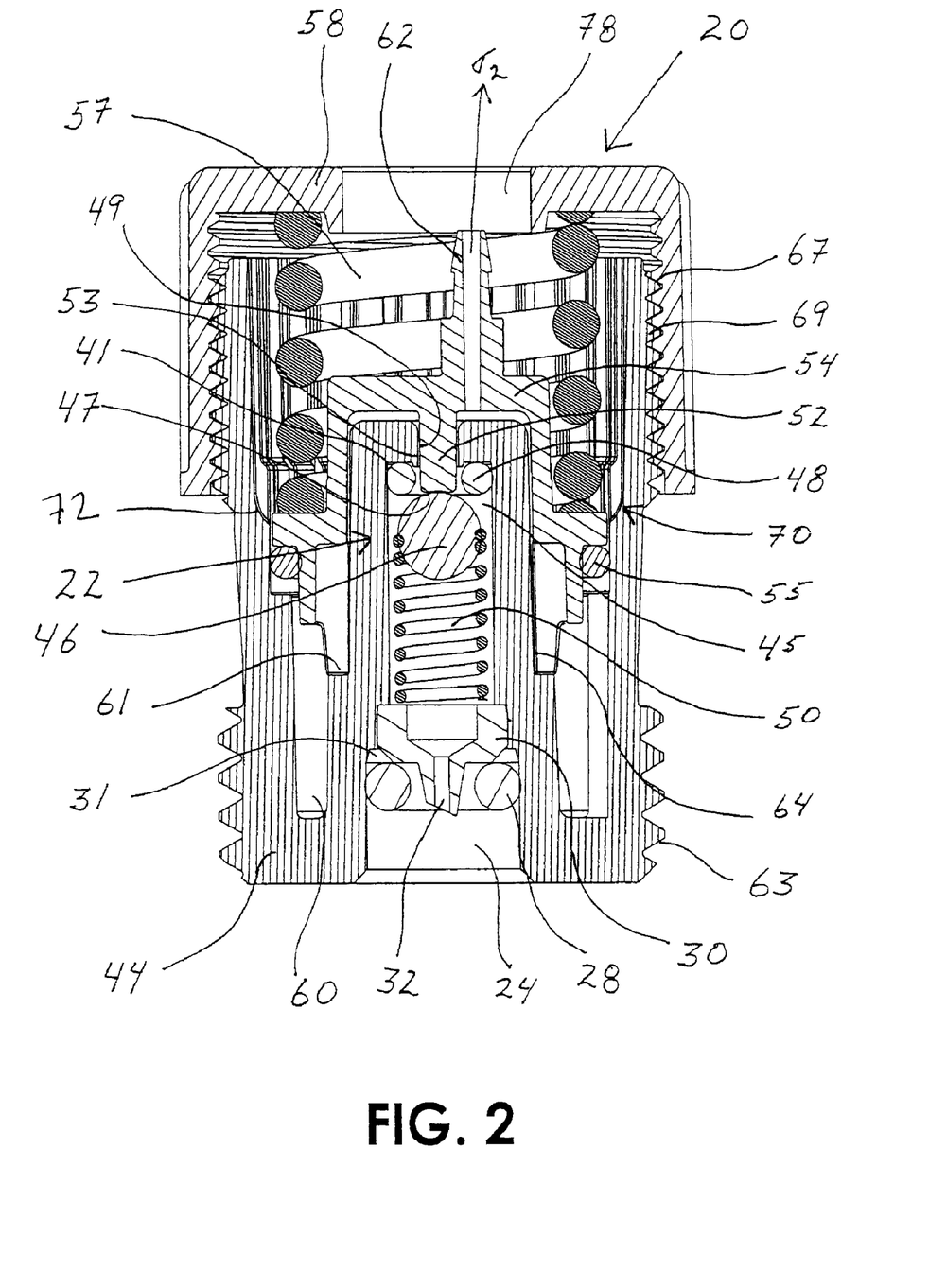
FIG. 2 illustrates a cross-section of an exemplary piston-type pressure regulator assembly of the present invention similar to that shown in FIG. 1, comprising a non-threaded lance housing, less a cartridge and cartridge-retaining container.

FIG. 2 illustrates a cross-section view of an exemplary assembled pressure regulator 20, in accordance with an embodiment of the present invention. A lance 30 is press-fit into the upstream end of a valve chamber 45 and punctures compressed gas cartridge seal, distally located on neck 26, shown in FIG. 1 when the same is brought into contact with lance 30. Current art utilizes both hollow and solid piercing lance designs. Hollow piercing lance 30 is illustrated showing a fluid port 32 disposed directly through the middle of piercing lance 30.

Formed within the interior wall of a lance housing 24 is an annular groove 31 that receives a piercing lance sealing ring 28. Upon harnessing compressed gas cartridge 21, shown in FIG. 1, sealing ring 28 creates an airtight seal between lance fluid port 32 and distal face of cartridge neck 26, shown in FIG. 1. Lance housing 24 currently has two major variations in the art being non-threaded and threaded. This embodiment illustrates non-threaded lance housing 24 and requires the use of cartridge-retaining container 38 to harness compressed gas cartridge 21, both shown in FIG. 1.

Further downstream from piercing lance 30 is valve chamber 45. At the upper end of valve chamber 45 is a valve assembly 22 that controls the flow of gas passing through pressure regulator 20. Main valve assembly 22 includes a rigid valve ball 46, a spring 50, and a valve ball sealing ring 48. Rigid valve ball 46 is preferably made of a hard, metallic material such as stainless steel or hard-chrome plated steel. Other materials, even non-metallic, possessing adequate material properties are also considered to be within the scope and spirit of this invention. Main valve assembly 22 is incorporated into body 44 in the following manner. Valve ball sealing ring 48 is inserted into valve chamber 45 and positioned within a groove 41 provided at the downstream end of valve chamber 45. Following insertion of sealing ring 48, valve ball 46 is positioned in contact with sealing ring 48. The leading end coil of compression spring 50 is then positioned about the circumference of valve ball 46 and is compressed within valve chamber 45 by press-fitting piercing lance 30 into the upstream end of valve chamber 45.

Figure 4:
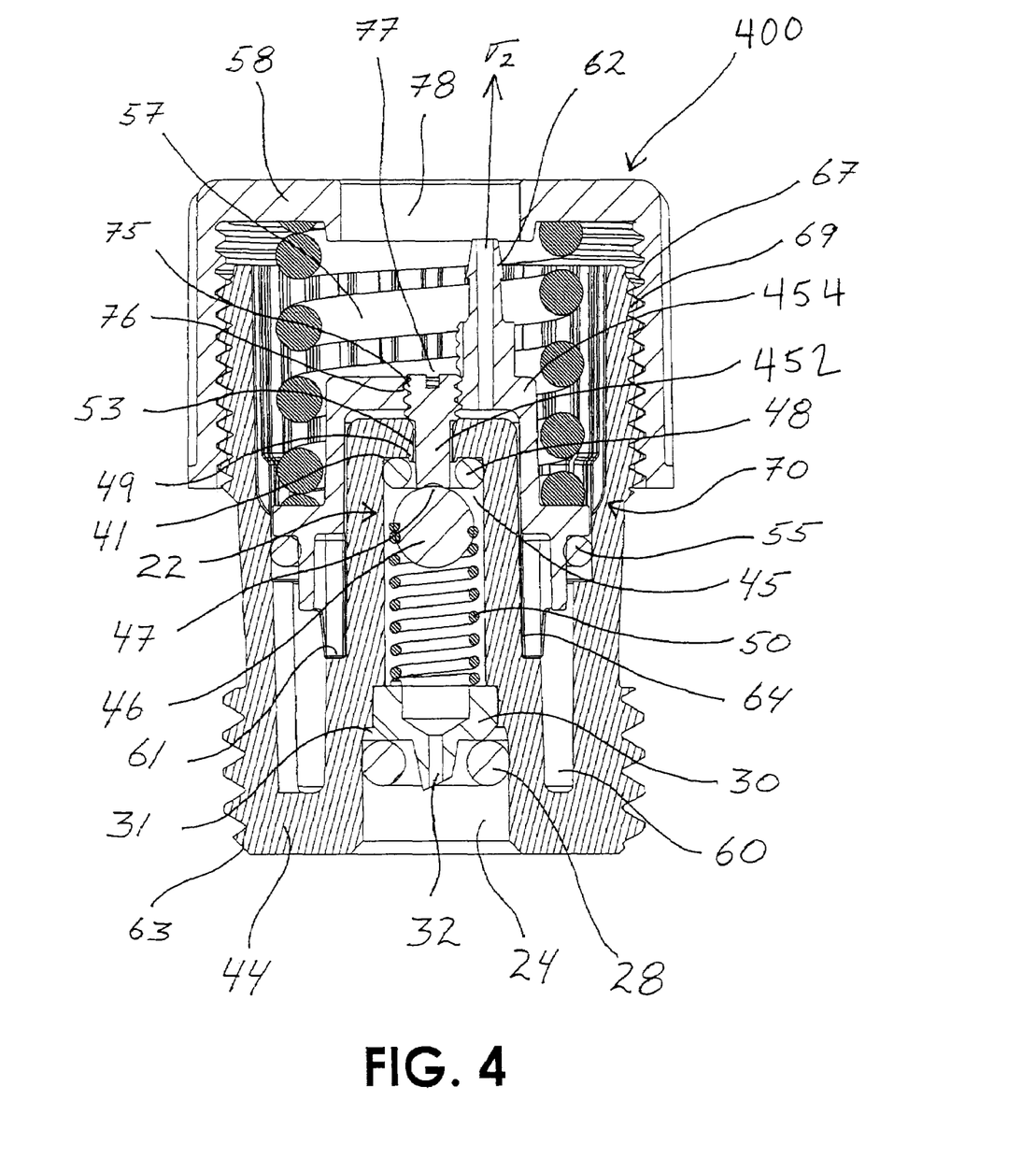
FIG. 4 illustrates a cross-section view of an exemplary piston-type pressure regulator assembly comprising an adjustable height plunger and non-threaded lance housing, in accordance with an embodiment of the present invention.
Figure 5:
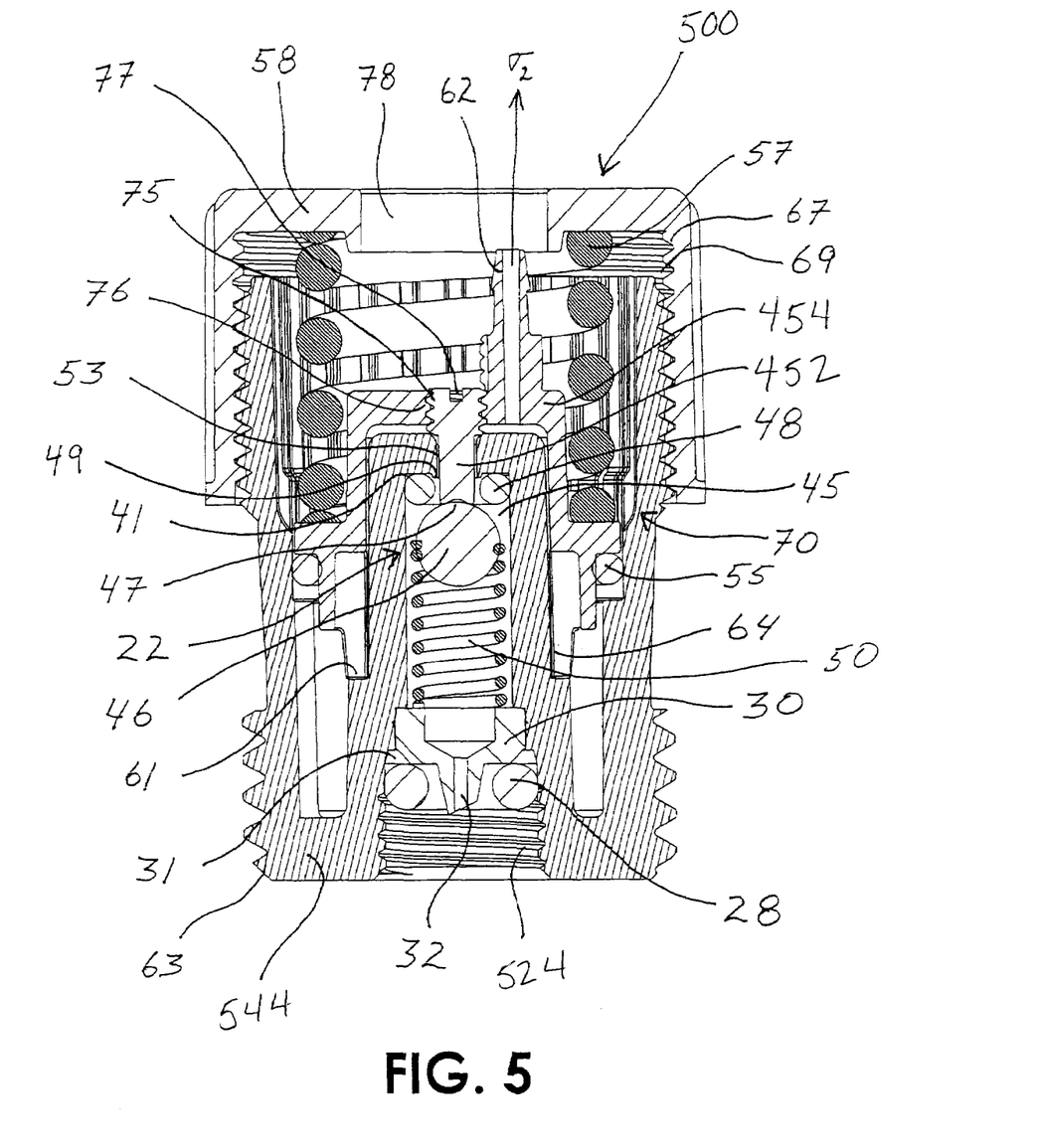
FIG. 5 illustrates a cross-section view of an exemplary piston-type pressure regulator assembly comprising an adjustable height plunger and a threaded lance housing, in accordance with an embodiment of the present invention.
Figure 6:
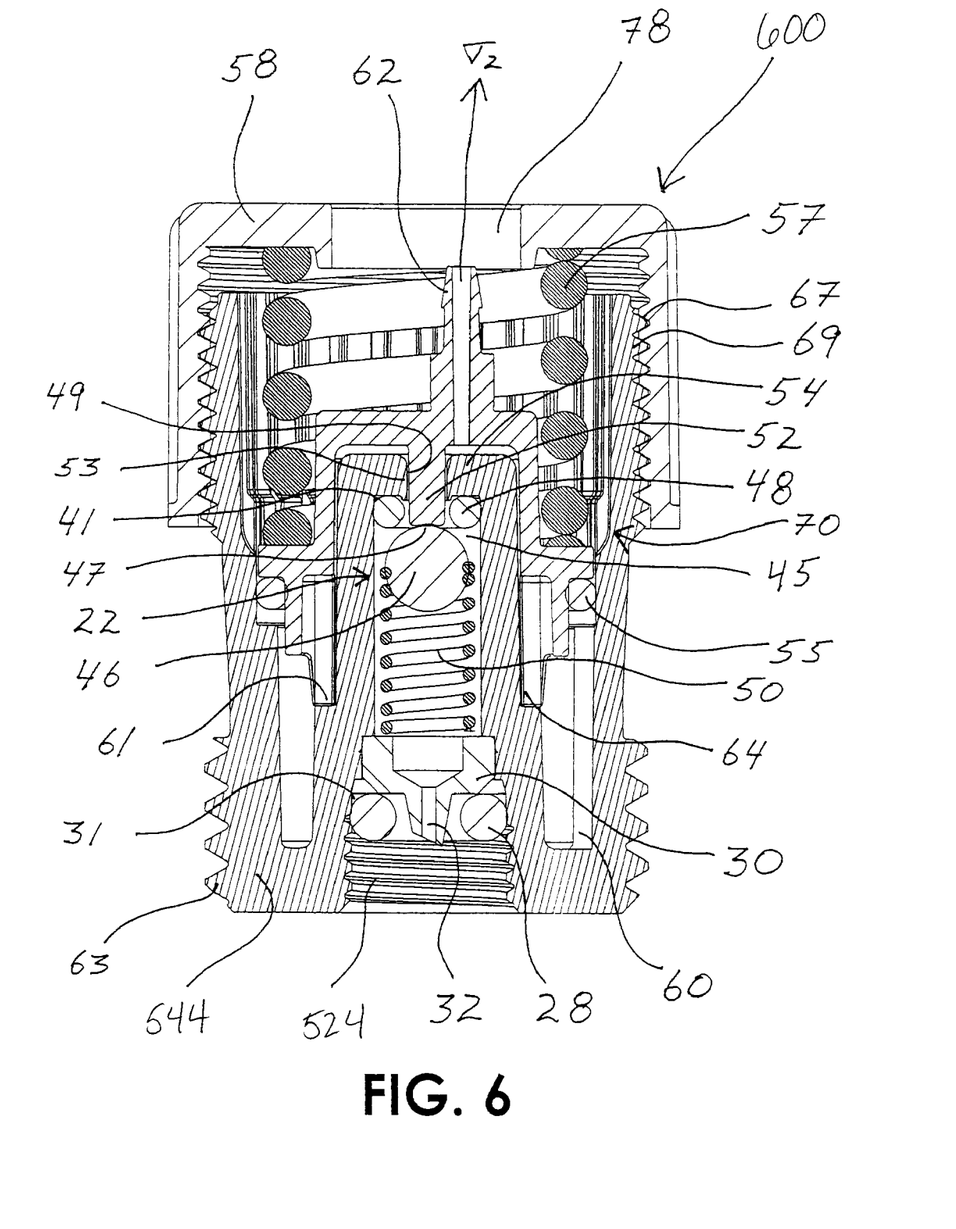
FIG. 6 illustrates an assembled cross-section view of a piston-type pressure regulator assembly comprising a threaded lance housing, in accordance with an embodiment of the present invention.

Illustrated in FIG. 2 and additionally in FIGS. 4-6, a valve ball seat 49 extends into valve chamber 45 to limit the motion of valve ball 46 during inoperative periods and high-pressure situations such that sealing ring 48 is prevented from over-deformation and permanent deformation by rigid ball seat 49 that supports valve ball 46 when main valve assembly 22 is closed, thereby enabling long-term containment of unused gas. Additionally, this design of supportive valve ball seat enables extremely high pressures and pressure shocks to be reliably contained within valve chamber 45 as is the case upon lancing a compressed gas cartridge where initial cartridge lancing can slam main valve assembly 22 with high pressure gas. Additional benefits of rigid valve ball seat 49 limiting travel of valve ball 46 allows this valve assembly to handle cold and hot temperatures as well as temperature swings during service thereby affecting seal hardness as is common when harnessing high-pressure compressed gas cartridges, particularly at high flow rates where the gas is cool as it is changing from a substantially liquid phase in the cartridge to a gaseous phase as it is leaving the cartridge. The controlled limited compression of sealing ring 48 prevents sealing ring from taking a permanent compression set yet allows for a reliable seal.

Immediately downstream from valve ball seat 49 is a plunger channel 53. Plunger channel 53 is dimensioned to receive a plunger 52 that communicates at a contact interface 47 with valve ball 46 to open valve assembly 22. The dimensions of plunger 52 are slightly smaller than plunger channel 53. Two reasons for these dimensions are to allow plunger 52 to freely move in plunger channel 53 as well as allowing means for a fluid connection between valve chamber 45 and downstream to a regulated pressure contained on the bottom side of a piston 54 as will be discussed next.

Plunger 52 extends from plunger to valve ball interface 47, downstream through plunger channel 53 and integrally connects to piston 54. In this exemplary embodiment, plunger 52 is monolithically formed as a feature of piston 54. A piston guide 64 is formed as an integral feature of regulator body 44 and is dimensioned slightly smaller than piston skirt inside diameter thereby preventing an interference fit. These stated dimensions allow piston 54 to freely move along guide 64 as well as allowing means for fluid passage between plunger channel 53 and a piston bore 60, also formed as an integral part of regulator body 44.

In use, the pressure contained in piston bore 60 on the (bottom) plunger side of piston 54 will be defined as regulated pressure herein expressed as $\sigma_2$ (shown in FIGS. 2, 4, 5, 6). Piston 54 freely moves in piston bore 60 aligned by guide 64, and isolates regulated pressure $\sigma_2$ from the topside of piston 54 by piston seal 55.

Located on the topside of piston 54 is a compression piston spring 57. Piston spring 57 is inserted through the top of regulator body 44, contacting the top of piston 54 and retained by a cap 58. Cap 58 comprises a female thread at 67 and correspondingly threads to a male thread at 69 onto integrated threads in regulator body 44. Cap 58 has grip features molded into the outer diameter enabling an easy grip when adjusting preload on piston spring 57. Additionally, cap 58 has a large hole 78 in its top that allows a hose (not shown) to be mechanically connected to piston 54 and pass out of regulator assembly 20. Large hole 78 also allows any pressure on the topside of piston 54 to vent to the atmosphere.

Prior to piston 54 bottoming out on a travel limit shelf 61 in piston bore 60, plunger 52 contacts valve ball 46 at plunger to valve ball interface 47 and opens valve assembly 22. When valve assembly 22 is open, pressure equilibrium is achieved between lance fluid port 32 which is in pressure equilibrium with compressed gas cartridge 21 (FIG. 1), through valve chamber 45, all the way downstream to piston bore 60, contained by the bottom (plunger side) of piston 54 by piston seal 55. When no compressed gas cartridge is attached to regulator 20, valve 22 is biased in the open position by the force of piston spring 57.

Upon introduction of a high-pressure fluid from lancing a compressed gas cartridge, that exceeds 800 pounds per square inch pressure at room temperature for carbon dioxide, this fluid travels through valve assembly 22 and creates a new regulated pressure $\sigma_2$, pushing up on piston 54 and piston spring 57. The selected spring rate of piston spring 57 combined with the pre-loading of piston spring 57 by cap 78 determines regulated pressure $\sigma_2$. A higher spring force creates a higher regulated pressure $\sigma_2$.

An exit conduit 62 of regulated pressure $\sigma_2$ taps off the top of piston 54. An alternate exit conduit 73 of regulated fluid pressure could tap into regulator body 44 anywhere downstream from valve assembly 22 within pressurized piston bore 60 contained by piston seal 55 such as through a port in regulator body 44 rather than through the top of piston 54. Conduit is typical hose barb, NPT (National Pipe) threads, or similar connection and leads to any pneumatic or hydraulic device requiring a regulated, substantially constant working pressure to operate.

As regulated pressure $\sigma_2$ is tapped off exit conduit 62, regulated pressure $\sigma_2$ decreases, and in effect reduces the pressure contained on the bottom side of piston 54, allowing piston 54 to move down in piston bore 60 ultimately opening valve assembly 22 with plunger 52. Opened valve assembly 22 again introduces additional high-pressure fluid through plunger channel 53 and increases the pressure contained by piston 54, in effect, biasing piston 54 upward in piston bore 60 closing valve assembly 22, thereby substantially maintaining a consistent regulated pressure $\sigma_2$.

Figure 3:
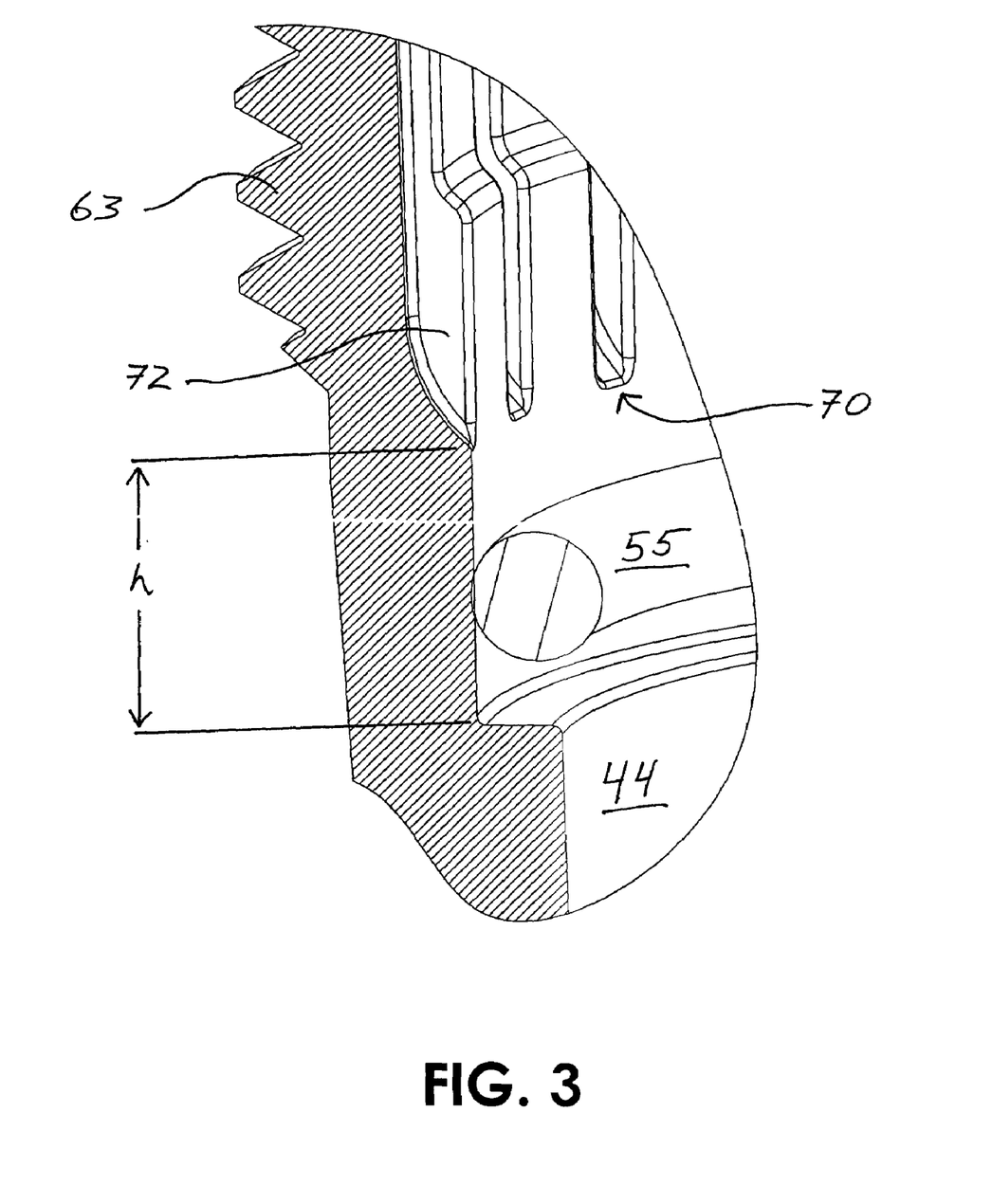
FIG. 3 illustrates an exemplary sectioned close-up view of a piston seal situated in its approximate operating position with respect to the regulator bore, in accordance with an embodiment of the present invention. Note: piston not illustrated in this view.

An over-pressurization prevention feature 70 is illustrated in FIGS. 2-6 more specifically comprising a negative vent or plurality of negative vents 72 visible in FIG. 3.

FIG. 3 illustrates an exemplary over-pressurization feature 70 detailing negative vents 72, in accordance with an embodiment of the present invention. Preferably, negative vents 72 are arranged in plurality, evenly spaced around piston bore though a single negative vent 72 could still be effective in its function. Piston seal 55 is shown in a sectioned close-up view in its approximate operating position in the regulator bore. Piston 54 (FIGS. 2, 4-6) is not shown in this view allowing a clear view of internal vent(s) 72 and their relation to piston seal 55. In the event that regulator valve assembly 22, (FIGS. 2, 4-6) fails to retain the high source pressure from compressed gas cartridge 21 (FIG. 1), or excessive pressure is introduced into regulator 20 (FIGS. 2, 4-6) through exit conduit 62, the potential exists for excessive pressure to enter piston bore 60. If this introduction of high pressure were to happen, excessive regulated pressure $\sigma_2$ would bias piston 54 upward, overcoming compressed piston spring 57 as pressure and spring force remain in equilibrium. As piston 54 and piston seal 55 translate upward, high pressure is allowed to escape through negative vent(s) 72. Pressure spikes downstream from regulator 20 that return to piston bore 60 are thus minimized by design. The gradual depth increase of negative vent(s) 72 as vents extend farther away from the resting location of piston seal 55 allow regulator to burp off any excessive pressure without damaging seal 55 due to the gradual transition, and preferably plurality of negative vents 72. In contrast, if negative vent 72 were simply a through hole (not illustrated)

that exits regulator body 44 perpendicular to piston 54 main axis, the likelihood of piston seal 55 to extrude into the exit hole from pressure and tear at the exit hole as the piston moves is greatly increased. In FIG. 3 a bore height h is shown as a reference for the height that piston seal 55 must travel in order for pressure blow-off to occur and will be explained more fully below.

Counting the number of components in the exemplary pressure regulator 20 illustrated in FIG. 2, comprises a total of twelve, including cartridge-retaining container 38 and compressed gas cartridge 21 (illustrated in FIG. 1). These components are as follows:

Adjuster cap 58
Main spring 57
Regulator body 44
Piston seal 55
Sealing ring 48
Sealing ball 46
Sealing ball spring 50
Piercing lance 30
Cartridge seal 28
Piston 54
Cartridge-retaining container 38 (FIG. 1)
Non-threaded neck compressed gas cartridge 21 (FIG. 1)

FIG. 4 illustrates an exemplary pressure regulator 400 featuring an adjustable height plunger 452, in accordance with an embodiment of the present invention. Operation is as follows: A threaded plunger 75 mates with a piston female thread 76. A slot 77 located on the top of threaded plunger 452 allows an operator to thread plunger 452 higher or lower into piston 254. The purpose of the adjustable plunger height allows the ability for one to tune the regulator to blow off at a desired back-pressure, independent of preload on piston spring 57. In operation, cap 58 preloads piston spring 57 thus providing a substantially constant spring force on regulator piston 254. Allowing plunger 452 to be moveable with respect to piston 254, the relationship between piston equilibrium position (and position of piston seal 55) and opening degree of valve assembly 22 can be tailored. Mostly to benefit from this feature is that the blow-off pressure is tunable. Rather than make bore height h (FIG. 3) of the regulator body over-pressurization prevention feature 70 differ in order to achieve vents at differing bore heights h, one species of regulator body 44 comprising negative vent(s) 72 in the same location can be used with tunable piston 254 and plunger 452 to achieve desired blow-off pressures rather than produce a variety of different regulator bodies 44 possessing differing bore height h.

In the embodiment illustrated in FIG. 4, one more component is added relative to the aforementioned embodiment illustrated in FIG. 2, threaded plunger 452, thus bringing the number of components up from twelve to thirteen (including compressed gas cartridge 21 and cartridge containing retainer 38, both shown in FIG. 1) but with added tuning capabilities.

FIG. 5 details yet another exemplary regulator 500 comprising the capability to dispense compressed gas cartridges possessing a threaded neck or non-threaded neck, in accordance with an embodiment of the present invention. An additional feature to a regulator body 544 differs slightly from regulator body 44 (FIGS. 2 and 4) in that a lance housing 524 is internally threaded. No cartridge-retaining container 38 (FIG. 1) is necessary in order to harness a compressed gas cartridge comprising threads on the cartridge neck is necessary in order to thread into lance housing 524. A compressed gas cartridge comprising a threaded neck is not illustrated in the FIGS. Similarly, non-threaded neck 26 compressed gas cartridge 21 utilized in conjunction with cartridge-retaining container 38 (FIG. 1) can still be dispensed with regulator body 544.

In the embodiment illustrated in FIG. 5, piston 254 and adjustable height plunger 252 share the same user-tunable blow-off pressure benefits as described in the embodiment illustrated and described in FIG. 4.

The number of components in the exemplary embodiment regulator 500 illustrated in FIG. 5 comprises twelve components from the elimination of cartridge-retaining container 38 when a threaded neck compressed gas cartridge 21 (FIG. 1) is dispensed. If a non-threaded compressed gas cartridge is to be dispensed utilizing a cartridge-retaining container 38 (FIG. 1), the exemplary assembly comprises thirteen components.

FIG. 6 illustrates an exemplary pressure regulator 600 capable of utilizing the least amount of components to function of the illustrated embodiments, in accordance with an embodiment of the present invention. Regulator body 544 comprises an internally threaded lance housing 524 capable of threadably mating to a threaded neck compressed gas cartridge (cartridge not illustrated). Regulator 600 features the same type of piston 54 and plunger 52 as exemplified in the embodiment illustrated and described in FIG. 2.

When a threaded neck compressed gas cartridge is dispensed, this embodiment comprises eleven components in order to function, including the compressed gas cartridge.

I claim:

1. A pressure regulation device adaptable to a compressed gas cartridge capable of delivering a substantially consistent outlet pressure, comprising:

a body comprising an externally threaded top portion and formed to include an internal piston bore, a negative vent interconnecting with said piston bore and extending outwardly through said body, a valve chamber extending inwardly through a bottom portion, and a plunger channel interconnecting said piston bore and said valve chamber;

a lance housing disposed in said valve chamber and terminating with a cartridge-piercing lance and a deformable seal situated around said cartridge-piercing lance;

a first spring disposed within said valve chamber and comprising a first end and a second end, wherein said first end of said first spring is in contact with said lance housing;

a valve ball in contact with the second end of said first spring;

a piston moveably disposed within said piston bore, wherein said piston is formed to include an exit conduit formed to include a lumen extending therethrough, wherein said lumen communicates with said plunger channel;

a plunger extending downwardly from said piston and comprising a distal end, wherein said distal end contacts said valve ball;

a cap rotatably and threadedly disposed around said top portion of said body;

a second spring having a first end and a second end, wherein said first end of said second spring contacts said cap, and wherein said second end of said second spring urges said piston downwardly in said piston bore with a preload force such that said piston blocks said negative vent;

wherein introduction of a back pressure into said piston bore greater than said preload force causes said piston to move upwardly thereby exposing said negative vent.

2. The pressure regulation device of claim 1 further comprising male threads externally disposed on said bottom portion of said body.

3. The pressure regulation device of claim 2, further comprising a cartridge-retaining container removeably attached to said bottom portion.

4. The pressure regulation device of claim 1, wherein said lance housing comprises a female 3/8-24 Unified National Fine thread.

5. The pressure regulation device of claim 1, wherein:
said plunger is threadedly attached to said piston;
said plunger comprises an adjustable height;
said adjustable plunger height permits tuning said regulator to vent a desired back-pressure independent of said preload force.

6. The pressure regulation device of claim 1, further comprising:
a body formed to include a plurality of negative vents interconnecting said piston bore and extending outwardly through said body;
wherein said second end of said second spring urges said piston downwardly in said piston bore with a preload force such that said piston blocks said plurality of negative vents;
wherein introduction of a back pressure into said piston bore greater than said preload force causes said piston to move upwardly thereby exposing said plurality of negative vents.

\* \* \* \* \*